3,717,576
GRAPHITE FLUORIDE-SYNTHETIC RESIN
COMPOSITE MATERIAL
Toshio Hiratsuka and Toshio Shimada, Yokohama, Japan, assignors to Nippon Carbon Co., Ltd., Tokyo, Japan
Filed July 14, 1969, Ser. No. 841,296
Int. Cl. C10m 5/02, 5/20
U.S. Cl. 252—12          2 Claims

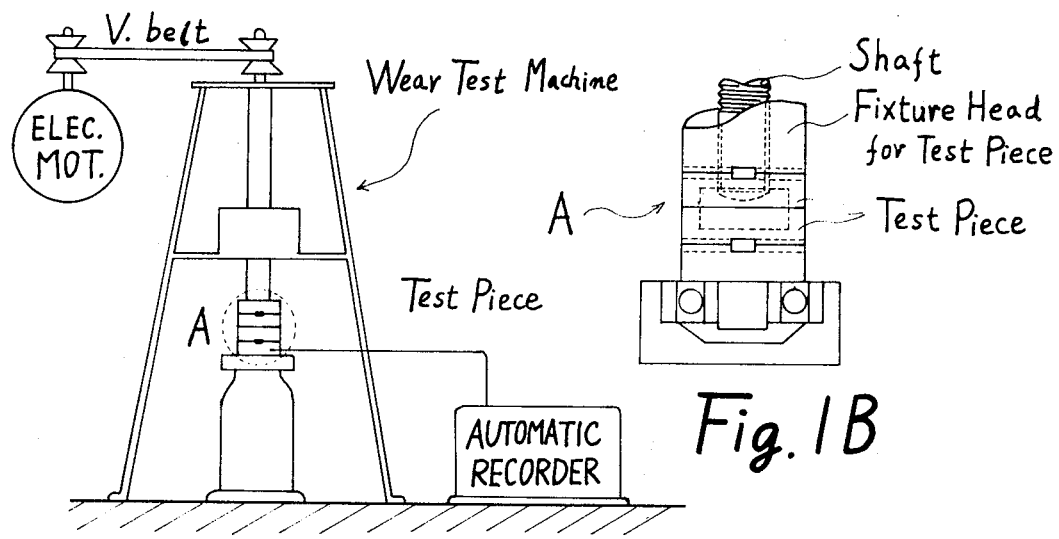
Fig. 1A
Fig. 1B
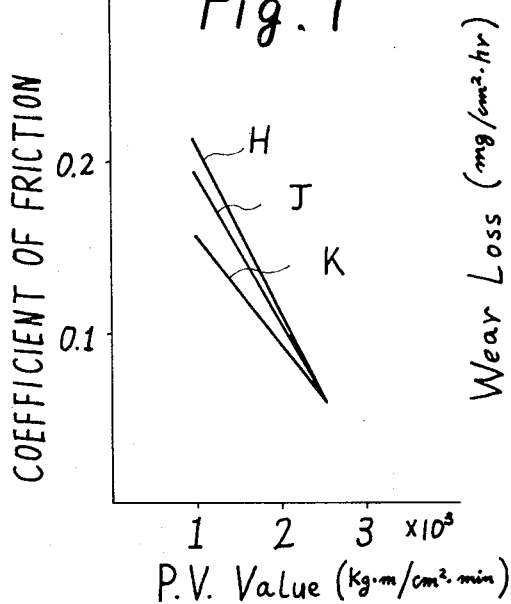
Fig. 7
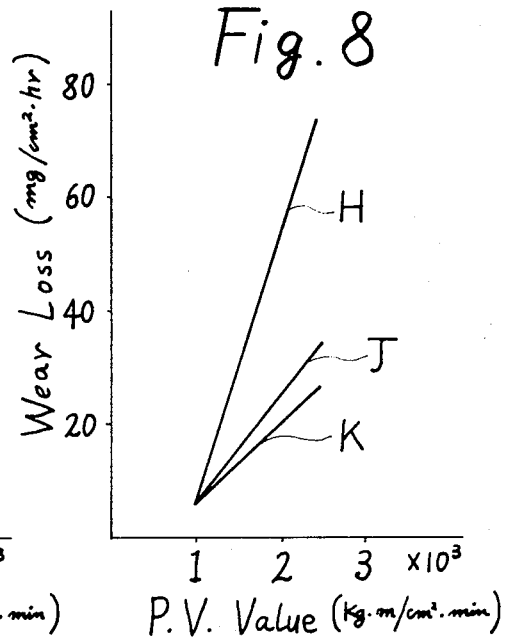
Fig. 8

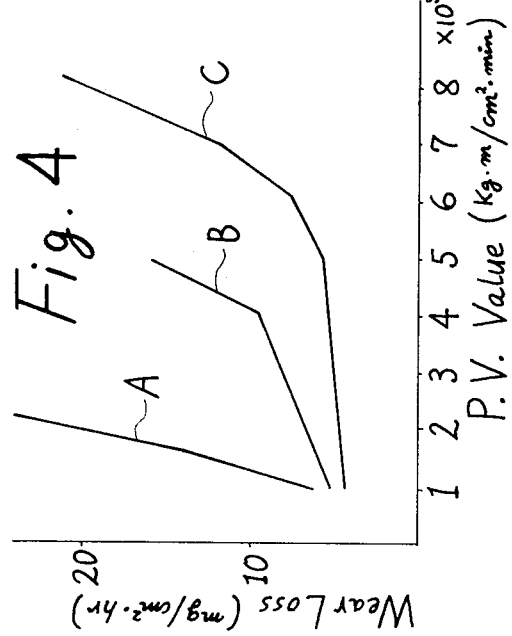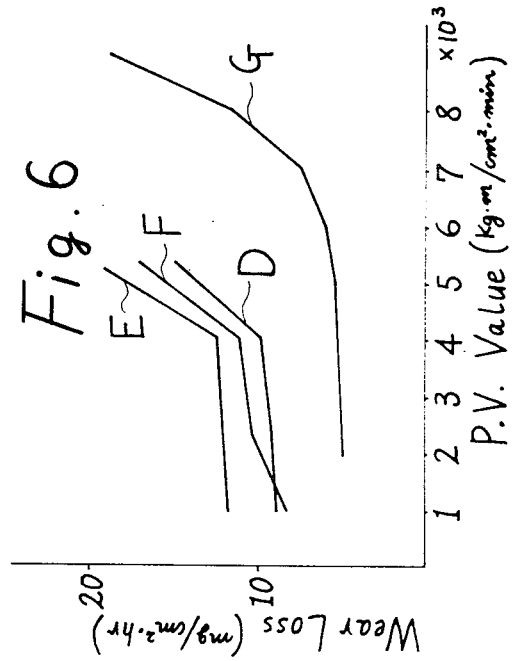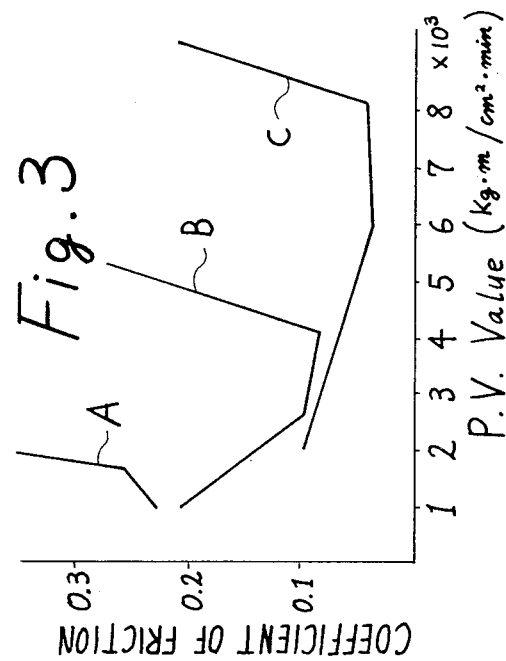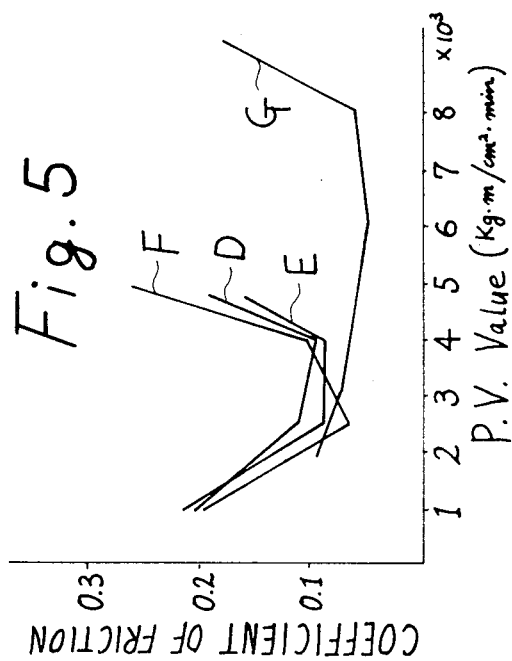

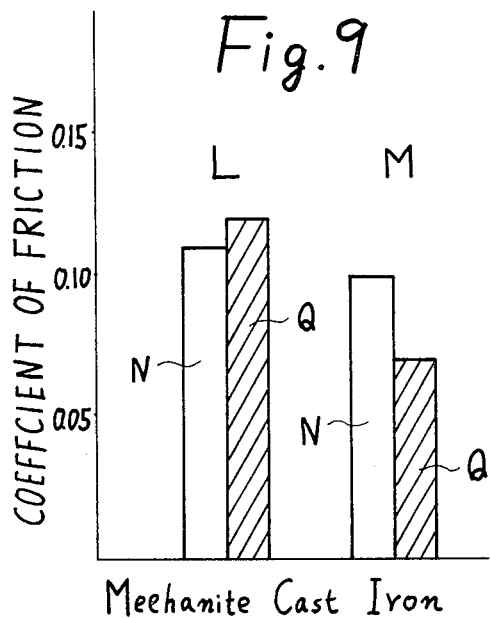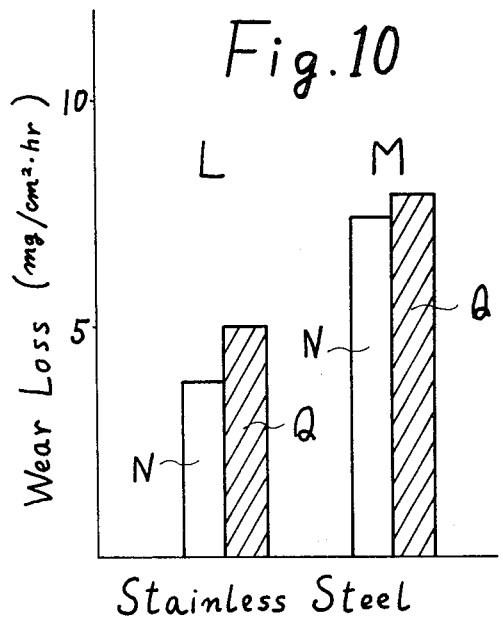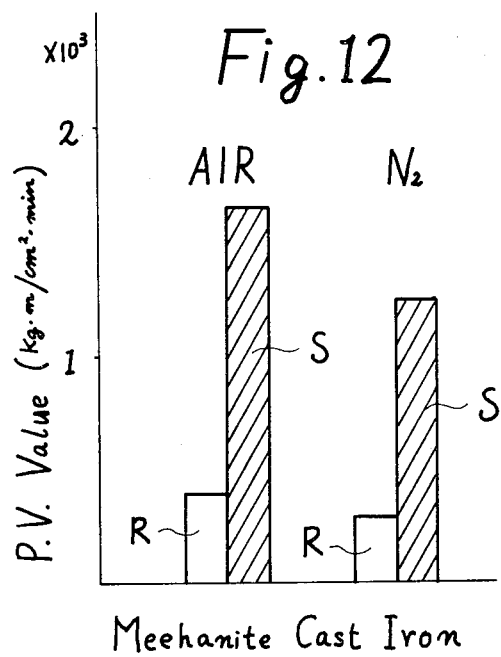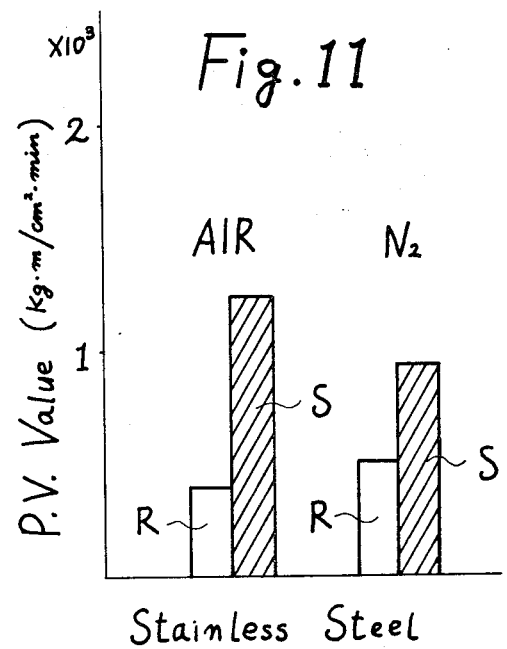

ABSTRACT OF THE DISCLOSURE

A method of making a composite bearing which comprises mixing and molding a synthetic resin, graphite fluoride, and a third component selected from artificial graphite, natural graphite, and non-crystalline carbon.

---

This invention relates to a novel graphite fluoride resin composite material, and more particularly, to a synthetic resin compound added with graphite fluoride.

The "graphite fluoride" is produced by fluorinating graphite or carbon, and may be called "carbon monofluoride." Its molecular formula is represented by $(CF)_n$ where the molar ratio is $C:F = 1:1$. This compound was already described by O. Ruff et al. in "Zeitschrift der anorganischen und allgemeine Chemie," vol. 217, pages 1–19 (1934). Further, it is described in detail in British Pats. 759,173 and 877,122; and also in U.S. Pat. 2,786,874. The graphite fluoride contemplated in the present invention is a high molecular polymeric material having the aforementioned recurring unit $(CF)_n$, which polymer is insoluble in organic solvents.

This invention is directed to a novel and improved bearing material so that the preparation of graphite fluoride (we adopt this term in this specification) is omitted.

Graphite fluoride has several peculiar characteristics, of which its lubrication property has been found to be most noteworthy by the inventors.

It is known that a self-lubricating bearing is available in the market. The term "self-lubricating bearing" designates a bearing whose working surface has an anti-friction characteristic sufficient to enable the bearing to work satisfactorily in the absence of an applied lubricant, such as, oil or grease. The working surface of the bearing is the surface in contact with a rotary shaft or other moving member of a machine in which it is used. A common form of self-lubricating bearing consists of a cylindrical metal housing containing a liner of a polymeric material which has a low coefficient of friction and which serves as the working surface of the bearing. The liner is referred to as a self-lubricating bearing material. Self-lubricating bearings are also commonly referred to as non-lubricated bearings, oilless bearings or dry bearings. Lubricants are sometimes applied to such bearings, for example, to achieve better efficiency or longer life under severe operating conditions, but generally are not required under ordinary conditions.

Many attempts have been made to provide the self-lubricating bearing which overcomes the limitations and drawbacks of oil or grease lubricated bearings. For example, it is known that the following self-lubricating bearings made of polymeric materials added with a variety of additives have been proposed:

(1) Fabric or felt made of polytetrafluoroethylene resin.

(2) A polytetrafluoroethylene polymeric material containing glass fiber, powdery molybdenum disulfide or graphite.

(3) A phenolic polymer material containing polytetrafluoroethylene, molybdenum disulfide or graphite.

(4) A sintered copper base alloy filled with or impregnated with molybdenum disulfide.

While some of the previously known polymeric bearing materials have shown quite satisfactory results for a number of uses, even the most excellent ones considered heretofore have had a tendency to fail on an extended use under severe conditions of high temperature, high speed, and high load. Failures have been attributed to the softening of the working surface of the polymeric bearing and a consequent seizure thereof due to an accumulated heat of friction, whereby the bearing material was seriously damaged.

As described above, the conventional self-lubricating bearing material of the prior art depends upon various conditions, such as, contact pressure, peripheral speed of a rotary shaft, temperature, and atmosphere, etc., so that there is a disadvantage that a sufficient PV value cannot be attained. The term "PV value" is an empirical value obtained by multiplying the load P on the bushing or liner, expressed kilogram per square centimeter over the project area by the shaft velocity in meter per minute. It is understood that the larger the PV value the better the bearing material.

We inventors have conducted an extensive research on miscellaneous additives to be added to the polymeric material for the bearing which overcomes the above limitations and drawbacks described above. As a result, we have found that the addition of graphite fluoride to the polymeric material enhances an outstanding ability thereof as a bearing material.

Furthermore, it is known that the self-lubricating bearing material can also be used for a seal, packing, and gasket, etc., and it finds its use in many fields of industry, such as, vane, mechanical seal, piston-ring, valve, apex seal, electrical insulator electrical resistor, electric resistance heater, dielectric material, thermal insulator, electric brush, and shock absorbing shim for vehicle wheel, etc., etc.

It is therefore an essential object of this invention to provide an improved self-lubricating bearing material consisting of a graphite fluoride resin composite compound.

A more specific object is to provide a self-lubricating bearing material which can be operable for extended periods under the conditions of high speed, high load, and high temperature, in other words, a self-lubricating bearing material having a high PV value.

An additional object is to provide a highly corrosion resistant self-lubricating bearing material wherein graphite fluoride is similar in its chemical and physical properties to those of polytetrafluoroethylene so that it develops its high resistance to corrosion.

A still further object is to provide a self-lubricating bearing material characterized by the possession of a long life together with a low coefficient of friction as well as a low wear under the severe conditions of high temperature, all of which being attributed to the addition of graphite fluoride which has the highest heat resistance up to the temperature of 550° C. among the known fluoroethylene polymers, and which being an inorganic fluorine containing polymeric compound having neither softening, fusion nor transition temperature, whereby the polymeric compound has been improved in its lubricating property.

Other important objects will be apparent from the following description of the invention, which, taken in connection with the accompanying drawing, discloses several preferred embodiments thereof.

Referring to the drawing:

FIG. 1A shows a wear testing machine for determining a PV value and a lubricating property of the novel composite material manufactured in accordance with this invention.

FIG. 1B is an enlarged portion of the machine structure set forth in FIG. 1A.

FIGS. 3-12 are graphic representations of PV values, coefficients of friction, and wear losses of various products of this invention, respectively, the details of which will be described hereinafter.

Figure 2:
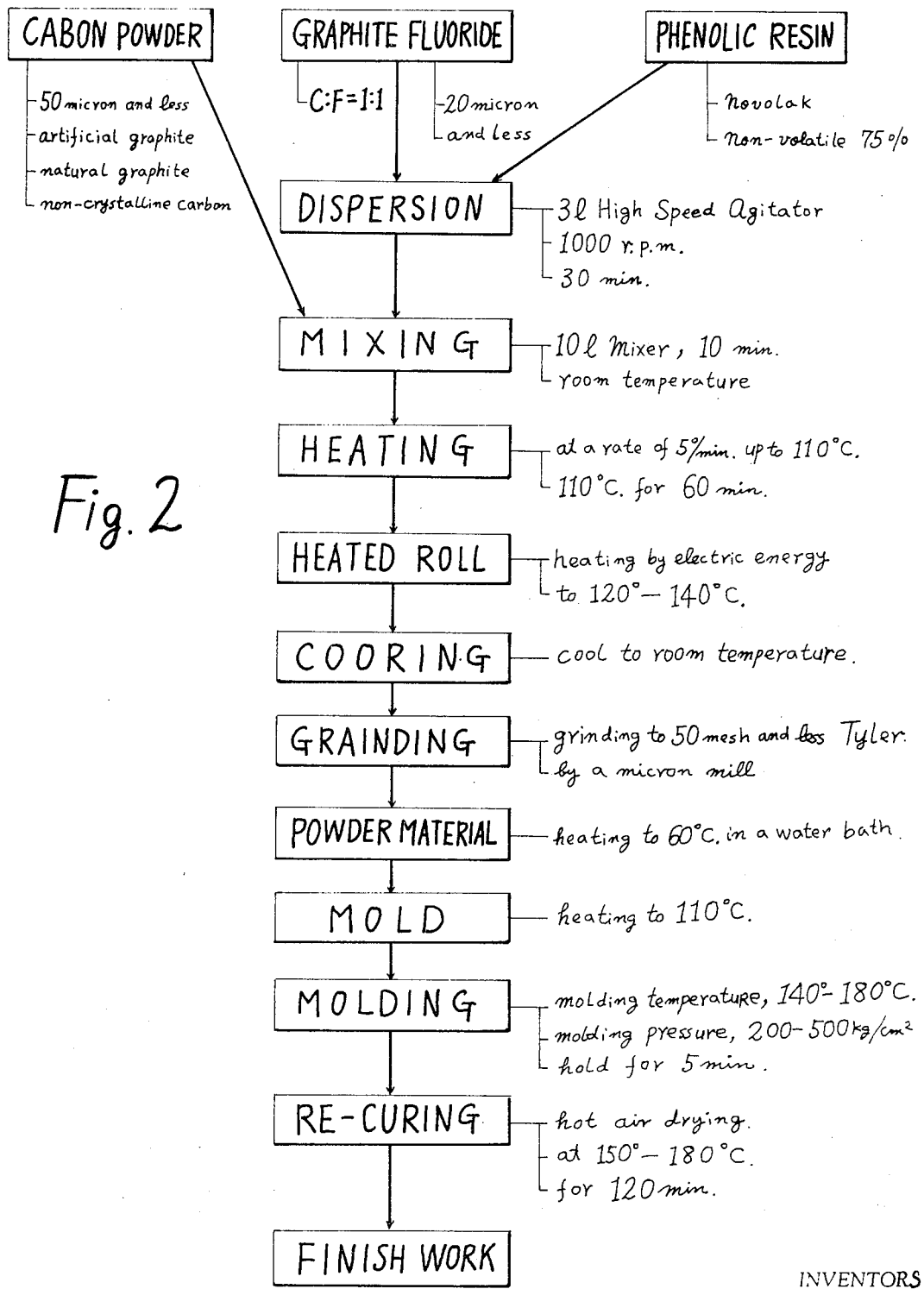
FIG. 2 is a flow-sheet for the manufacture of the composite material of this invention.

Referring more particularly to the flow-sheet of FIG. 2, a preferred method for the manufacture of the composite material of this invention is described. 1–80 parts by weight finely divided graphite fluoride having a particle size of 5 micron and less is dispersed into 10–35 parts by weight a liquid phenolic novolak synthetic resin in a 3 l. high speed agitator at 800–1000 r.p.m. for about 30 minutes to produce a graphite fluoride-phenolic resin liquid dispersion. An extender may be added to this liquid dispersion to increase its quantity, but this is not a requirement in this invention. As the extender, carbon or graphite powder is used in an amount of less than 80 parts by weight. Carbonaceous material adapted for the extender is selected from the group consisting of artificial graphite, natural graphite, and non-crystalline carbon including petroleum coke and anthracite. If the addition of carbon or graphite powder is effected, the thus obtained liquid dispersion is kneaded while heating it to a temperature of 110°–130° C. at a rate of 2° C./min. in order to remove volatile ingredients of the phenolic resin gradually. After about one hour by heating and kneading, a compound in a plastic state immediately before solidification is obtained. Then, this plastic compound passes a pair of heated rolls spaced about 0.5 mm. each other to a temperature of 120°–140° C. reciprocally two or three times to effect curing and homogenizing. In these steps, a homogeneous mixture is obtained while volatile ingredients are removed from phenolic resin. Thus, a homogenized raw material is cooled to room temperature, and then pulverized by means of a micron mill to powder having a particle size of 50 mesh Tyler and less. Then, a two-component raw material of graphite fluoride and phenolic resin or a three-component raw material consisting of graphite fluoride, carbon or graphite powder, and phenolic resin is placed in a metallic mold previously heated to 100° C. or thereabouts, and molded at 140°–180° C. under a molding pressure of 200–500 kg./cm.$^2$ to produce a final product which must be subjected to a desired finish work. It has been found that the phenolic resinous raw material containing 25% volatile ingredients is very hard to remove volatile ones completely. In consequence, it has been perceived that very often a crack or cause of destruction is formed on a sample or product in the course of determination. Therefore in this invention the product of this invention is again heated at a temperature of 150°–180° C. to effect curing as completely as possible.

It is to be understood that the synthetic resin adapted for carrying out this invention should not be limited to the novolak phenolic resin. Not to mention resol phenolic resin, urea resin, acetal resin, fluorine containing resin such as polytetrafluoroethylene, ABS (acrylonitrile-butadiene-styrene) resin, styrene resin, vinylic resin, nylon 6, nylon 66, polycarbonate resin, epoxy resin, furan resin, and DVB (divinylbenzene, trivinylbenzene) resin, etc. are all included in this invention.

A mechanical strength of the final product thus obtained depends upon the total content of graphite fluoride, resin, and carbon or graphite powder. Average properties of the 3-component composite are as follows:

| | Shore hardness | Flexural strength, kg./cm.$^2$ | Compressive strength, kg./cm.$^2$ |
|---|---|---|---|
| Composite: | | | |
| 1 | 57–60 | 640–670 | 1,200–1,500 |
| 2 | 73–85 | 600–950 | 2,200–2,500 |

Note.—Composite 1, graphite fluoride, resin, and graphite powder; Composite 2, graphite fluoride, resin, and carbon powder.

The results of wear test of the composite material of this invention depend upon the test requirements of a wear testing machine to be applied. Therefore we should take the choice of a wear test machine and the method of measurement into consideration. In general it is required in the wear test that both speed and pressure should be selected as desired and the test be conducted both in an atmosphere and during lubrication. It is also required that the change of an opposite material against the sample to be tested be easily effected.

In view of the above requirements, the wear test machine employed in this invention is the one shown in FIG. 1A, wherein the sample to be tested has the same frictional area of contact as that of an opposite material so that the whole surfaces of them are completely in contact with each other. As a result, the rise of temperature at the contact surfaces tends to be remarkable so that the condition of wear test is more severe than the actual condition. Hence, the sample can be used in practical service up to a higher PV value than that obtained by the test machine in question. In reference to the measurement of a coefficient of friction, it is arranged that the coefficient of friction is to be shown by a spring balance wherein a lower sample is dragged by friction and slide takes place as soon as a rotary force overcome a frictional force.

The wear test procedure is as follows: a load P is in order varied at a constant peripheral speed, meter per minute, and a wear test is effected at each load P for a period of 60 minutes. This test is repeated until seizure takes place on the sample. The measurement of coefficient of friction $\mu$ (mu), temperature $t$, and amount of wear W, respectively, is performed in order to determine the limit PV value of each sample under the specified condition of operation. The term "PV value" is an empirical value obtained by multiplying the load P on the bushing of the bearing expressed as kilogram per square centimeter over the project area by the shaft velocity V in meter per minute as described hereinbefore. It is seen that the PV value depends largely upon the opposite sliding material, the composition of the atmosphere, and the peripheral speed. The term "limit PV value" is a limit value obtained by multiplying the P and the V where an abnormal phenomenon takes place in the frictional coefficient, wear amount or temperature of the working surface when the sample is subjected to the wear test under the specified condition of operation. This limit PV value should be a very important value when a material is chosen from the viewpoint of machine design. In other words, it shows that the larger PV value the bearing material has under any condition of operation the more excellent it is.

Graphic representations of PV values, frictional coefficients, and wear losses of various products obtained by means of the wear test machine of FIGS. 3–12 will be described in more details hereinafter.

In FIGS. 3–4, A denotes a composition of graphite and phenolic resin, B a composition of 1% graphite fluoride, graphite, and phenolic resin, and C a composition of 20% graphite fluoride, graphite, and phenolic resin. These graphs are obtained by conducting the wear test in which the opposite material and the sample are water cooled to maintain the temperatures of them to a temperature of 80°–100° C. in order to prevent them from raising temperatures too high. This cooling is effected for a period of about two hours. The graphs of frictional coefficients, wear losses, and PV values are plotted down.

FIGS. 3–4 show as follows: the composition A containing no graphite fluoride has a PV value of 1000–1200 wherein in this range seizure takes place due to the rise of torque; and the composition B up to 4000 and the composition C up to 8000. In the compositions B and C, it is seen from the graphs that neither softening nor seizure takes place up to the PV values specified above so that a smooth and continuous operation can be effected together with a stable low frictional coefficient and a small wear loss.

An improved effect of adding graphite fluoride can be perceived from FIGS. 5–6 wherein the frictional coefficients, wear losses and PV values of the composition of graphite and phenolic resin added with 1%, 2%, 5%, or 20% graphite fluoride, respectively, are plotted from the results of test conducted by the wear test machine of FIG. 1A. In FIGS. 5–6, it is seen that the compositions of graphite, phenolic resin, and 1% (D), 2% (E), and 5% (F) graphite fluoride, respectively, show their PV values up to 4000 while 20% (G) graphite fluoride its limit PV value 8000 together with a stable low frictional coefficient and small wear loss in a wide range for an extended period of time.

In reference to the effect of addition of graphite fluoride, it has been found that the addition of 5–80% by weight graphite fluoride to the phenolic resin and of 1–50% by weight to the composition of phenolic resin and graphite enhance its effect considerably.

On the other hand, however, the conventional bearing materials, such as, graphite fabric coated with polytetrafluoroethylene and phenolic resin containing molybdenum disulfide and graphite, have shown their PV values at most 8000. If the PV value more than 8000, they have failed.

The composition of phenolic resin and coke powder is widely used as a bearing material where a high mechanical strength is required, but its limit PV value reaches 200 only in spite of having a high mechancal strength.

FIGS. 7–8 show the frictional coefficients, wear losses, and PV values of the compositions of coke powder, phenolic resin, and 1% by weight (H), 2% by weight (J), and 5% by weight graphite fluoride, respectively, in the graphic representation. The composition of graphite and phenolic resin has its limit PV value 1000–1200 while that of coke and phenolic resin its limit PV value 160–200.

However, the composition of coke, phenolic resin, and 1–5% graphite fluoride in accordance with the teachings of this invention has its limit PV value 2500, which is exceedingly improved, and further, which is a very high PV value unattainable by the addition of the conventionable additive, such as, molybdenum disulfide or polytetrafluoroethylene. It has been found that the addition of graphite fluoride in an amount of as little as 1% by weight attains its object satisfactorily.

As described above, the graphite fluoride has a particularly good lubricity, and its good lubricant property is shown even by a fluoride surface layer of carbon or graphite particle, that is, the carbon or graphite particle whose surface layer only is fluorided. The core of the carbon or graphite particle having the fluorided surface layer remains carbon or graphite. Though the fluorided surface layer is broken during service, its lubricity will not be worsened to a high degree because its core is carbon or graphite having lubricity.

In FIGS. 9–10, N denotes the composition of graphite, phenolic resin, and 10% by weight graphite fluoride, and Q the composition of graphite, phenolic resin, and 10% by weight molybdenum disulfide, and besides, L denotes the results of water cooled test while M the results of test in the air by the wear test machine of FIG. 1A in the graphic representation. In the same FIGS. 9–10, L shows the results of water cooled test at the PV value 2000 while M the results of test in the air at the PV value 1000, and the white area the composition containing 10% by weight graphite fluoride while the oblique line area the one containing 10% by weight molybdenum disulfide.

It is clear from FIGS. 9–10 that in both tests of water cooling and in the air, the composition N containing graphite fluoride exhibits a better property in frictional coefficient and wear loss, and further, an entirely stable frictional coefficient during a prolonged period of operation. On the contrary, the composition Q containing molybdenum disulfide shows both frictional coefficient and wear loss as similar as the composition N, but a much larger torque of start and a very unstable frictional coefficient in operation.

FIGS. 11–12 show the results of test on the effect of addition of graphite fluoride in connection with an opposite material and a chemical analysis of atmosphere wherein both tests in the air and in the nitrogen stream are conducted on both the composition R of graphite and phenolic resin, and the composition S of graphite, phenolic resin, and 10% by weight graphite fluoride against both stainless steel (SUS–27) and Meehanite cast iron as an opposite material, respectively.

FIG. 11 shows that the conventional composition R of graphite and phenolic resin has a limit PV value less than 500 in the test in the air when the opposite material is stainless steel while the composition S of graphite, phenolic resin, and 10% weight graphite fluoride exhibits its limit PV value 1300 in the same test as above when the opposite material is the same as above, which confirms that the effect of adding graphite fluoride is noticeable. In the test in the nitrogen stream the above composition S has its limit PV value more than two times as big as that of the composition R, and its frictional coefficient, wear loss, and temperature of the working surface are as stable as in the test in the air. It is also seen that the effect of adding graphite fluoride is noticeable when the opposite material is of Meehanite cast iron in both tests in the air and in the nitrogen stream, which is clearly seen in FIG. 12. In FIG. 12 the limit PV value of the composition S against Meehanite cast iron is 1700 in the test in the air and 1400 in the nitrogen stream while that of the composition R is less than 400 in the air and nitrogen.

The invention will be described in more detail in connection with the following Examples 1–10.

EXAMPLE 1

This example relates to the manufacture of a composition of an artificial graphite and a phenolic resin, contains no graphite fluoride at all.

4 kg. of artificial graphite powder having a particle size less than 200 mesh and 1 kg. of the novolak phenolic resin (non-volatile 75%) are mixed in the 10 l. mixer at room temperature for 10 minutes. The subsequent steps, heating, heated roll, cooling, grinding, heating in a water bath, heating a mold, molding, and recuring are the same as described and shown in connection with the flow-sheet of FIG. 2 hereinbefore.

The composition A of graphite and phenolic resin thus obtained has a specific gravity 1.83 and a Shore hardness 58.

FIGS. 3–4 show the PV values, coefficients of friction, and wear losses of the above composition A, and these are obtained by subjecting it to the measurement by means of the wear test machine of FIG. 1A wherein a load is varied at the constant peripheral speed 500 m./min., and the temperature of friction should be cooled down less than 100° C. by water cooling during the sliding motion for a period of 60 minutes. This procedure of test is the same as with the following examples.

EXAMPLE 2

50 g. of graphite fluoride (20 micron and less) and 1 kg. of novolak phenolic resin (non-volatile 75%) are agitated in the 3 l. high speed agitator at 1000 r.p.m. for 30 minutes to produce a dispersion. Then, 3,950 g. of artificial graphite powder (200 mesh and less) is mixed with the dispersion in the 10 l. mixer at room temperature for 10 minutes.

The subsequent and remaining steps are the same as those described in Example 1.

The composition B of graphite fluoride, resin, and graphite powder thus produced has a specific gravity 1.84 and a Shore hardness 57. The graphs in properties of the composition B are shown in FIGS. 3–4.

EXAMPLE 3

The method of the flow-sheet of FIG. 2 in connection with Example 2 is applied to this example except the quantities of three ingredients as follows: 1 kg. of graphite fluoride, 1 kg. of phenolic resin, and 3 kg. of artificial graphite powder.

The composition C thus produced in this example has a specific gravity 1.86 and a Shore hardness 43. The properties of C are also shown in graphs in FIGS. 3–4.

EXAMPLE 4

FIGS. 5–6 show the properties in graph of the compositions D, E, F, and G wherein D refers to 1% graphite fluoride, E 2%, F 5%, and E 20%, respectively. The methods for the preparation of compositions, D, E, F, and G are all the same as the preceding examples. In these cases, however, the quantity of graphite powder must be reduced in place of an increased quantity of graphite fluoride to be added.

EXAMPLE 5

Examples 5–7 relate to the manufacture of the 4-ingredient compositions H, J and K together with the graphs of properties of them as shown in FIGS. 7–8.

Quantities of four ingredients of Example 5 are: 50 g. of graphite fluoride, 1 kg. of phenolic resin, 450 g. of artificial graphite, and 3,500 g. of coke (non-crystalline carbon).

The manufacturing steps are the same as those of the flow-sheet of FIG. 2 described hereinbefore and also in connection with Example 2. Specific gravity 1.76, and Shore hardness 73.

EXAMPLE 6

Quantities of four ingredients are: 100 g. of graphite fluoride, 1 kg. of phenolic resin, 400 g. of artificial graphite, and 3,500 g. of coke. Specific gravity 1.75 and Shore hardness 78.

EXAMPLE 7

The materials are: 250 g. of graphite fluoride, 1 kg. of phenolic resin, 250 g. of artificial graphite, and 3,500 g. of coke.

Specific gravity 1.73 and Shore hardness 71.

EXAMPLE 8

From the materials, 500 g. of graphite fluoride, 1 kg. of phenolic resin, and 3,500 g. of artificial graphite, the composition N shown in FIGS. 9–10 is obtained by the manufacturing steps of FIG. 2. The composition N is subjected to the test by water cooling and in the air, the results of which are shown in FIGS. 9–10.

EXAMPLE 9

The composition Q is produced from the materials, 500 g. of molybdenum disulfide (particle size 0.5 micron and less), 1 kg. of phenolic resin, and 3,500 g. of artificial graphite by the same process described in Example 8. The composition Q contains molybdenum disulfide in place of graphite fluoride. The results of the same tests as in Example 8 are shown in FIGS. 9–10.

EXAMPLE 10

The following table shows the data of various resinous compositions containing graphite fluoride:

|  | Percent Graphite | G.F. | A.S.G. | Hs | PV value | W.L., mg./cm.²/hr. |
|---|---|---|---|---|---|---|
| ABS, percent: |  |  |  |  |  |  |
| 36.5 | 63.5 |  | 1.58 | 34 | 1,460 | 32.4 |
| 36.5 | 44.5 | 19 | 1.60 | 41 | 1,280 | 69.0 |
| 36.5 | 31.7 | 31.8 | 1.56 | 52 | 1,930 | 16.6 |
| 36.5 | 19.0 | 44.5 | 1.60 | 60 | 1,280 | 36.7 |
| 25.0 | 37.5 | 37.5 | 1.71 | 47 | 1,460 | 50.2 |
| PTFE, percent: 30 | (35) | 35 | 1.89 | 44 | 1,300 | 38.0 |
| Acetal (Delrin), percent: |  |  |  |  |  |  |
| 70 | 16 | 14 | 1.89 | 41 | 1,520 | 19.9 |
| 65 | 16 | 19 | 1.97 | 41 | 2,100 | 22.1 |
| 75 | 25 |  | 1.77 | 38 | 870 | 37.0 |
| Polycarbonate, percent: |  |  |  |  |  |  |
| 35 | 30 | 35 | 1.68 | 51 | 1,350 | 87.2 |
| 15 | 50 | 35 | 1.86 | 37 | 1,100 | 68.3 |
| Epoxy, percent: 25 | 55 | 20 | 1.84 | 39 | 650 | 27 |
| DVB, percent: 30 | 50 | 20 | 1.78 | 37 | 440 | 43 |
| Furan, percent: 30 | 50 | 20 | 1.85 | 42 | 870 | 12.5 |

NOTE.—G.F.=graphite fluoride; A.S.G.=apparent specific gravity; Hs=Shore hardness; W.L.=wear loss; ABS=acrylonitrile butadiene styrene resin; PTFE=polytetrafluoroethylene resin; (35)=graphite fiber 35% by weight; DVB=divinylbenzene resin.

It will be apparent that various modifications may be made in the compositions without departing from the spirit and scope of the invention, the compositions hereinbefore described being merely some preferred embodiments thereof.

We claim:

1. A method for the manufacture of a self-lubricating graphite fluoride thermosetting synthetic resin composite bearing material having a high PV value comprising the steps of providing a dispersion containing 1.0–80% by weight of a high molecular weight graphite fluoride polymer insoluble in organic solvents represented by the molecular formula $(CF)_n$ having a molar ratio, C:F=1:1, which polymer is in the form of a powder having a particle size of 5 microns and less in a liquid thermosetting synthetic resin selected from the group consisting of phenolic resins, urea resins, polytetrafluoroethylene resins, epoxy resins, divinylbenzene resins, furan resins and trivinylbenzene resins, heating said dispersion to 110° C., passing said dispersion which is semi-sold by said heating through at least a pair of rolls spaced 0.5 mm. therebetween and heated to a temperature of 120°–140° C. to produce a thin solid substance, cooling said thin solid substance to room temperature, grinding said solid substance to a particle size of 50 mesh and less Tyler, molding said ground powder in a mold at a temperature of 140°–180° C. under a pressure of 200–500 kg./cm.² to form a shaped product, and curing said shaped product at a temperature of 150°–180° C. for a period of at least 120 minutes.

2. A method as set forth in claim 1 in which an extender in the form of carbonaceous powder selected from the group consisting of artificial graphite, natural graphite, and non-crystalline carbon in an amount of less than 80 percent by weight based on said dispersion is added to said dispersion before said heating thereof.

(References on following page)

References Cited

UNITED STATES PATENTS

| | | | |
|---|---|---|---|
| 3,607,747 | 9/1971 | Ishikawa et al. | 252—12 |
| 2,400,091 | 5/1946 | Alfthan | 252—12 |
| 2,400,099 | 5/1946 | Brubaker et al. | 252—12 |
| 2,672,443 | 3/1954 | Screnock | 252—12.6 |
| 2,786,874 | 3/1957 | Teeters et al | 260—653.1 |
| 2,824,060 | 2/1958 | White | 252—12 |
| 2,975,128 | 3/1961 | Stott | 252—12 |
| 3,287,288 | 11/1966 | Reiling | 252—12 |
| 3,397,087 | 8/1968 | Yoshizawa | 117—228 |

FOREIGN PATENTS

| | | | |
|---|---|---|---|
| 877,122 | 9/1961 | Great Britain | 252—12 |

DANIEL E. WYMAN, Primary Examiner

I. VAUGHN, Assistant Examiner